United States Patent
Caspall (10) Patent No.: US 11,286,989 B2
(45) Date of Patent: Mar. 29, 2022

(54) DOUBLE ROW SPHERICAL ROLLER BEARING

(71) Applicant: COOPER ROLLER BEARINGS CO LTD, King's Lynn (GB)

(72) Inventor: Martin Caspall, King's Lynn (GB)

(73) Assignee: COOPER ROLLER BEARINGS CO LTD

( * ) Notice: Subject to any disclaimer, the term of this patent is extended or adjusted under 35 U.S.C. 154(b) by 0 days.

(21) Appl. No.: 16/976,391

(22) PCT Filed: Feb. 20, 2019

(86) PCT No.: PCT/GB2019/050456
§ 371 (c)(1),
(2) Date: Aug. 27, 2020

(87) PCT Pub. No.: WO2019/166779
PCT Pub. Date: Sep. 6, 2019

(65) Prior Publication Data
US 2021/0054881 A1    Feb. 25, 2021

(30) Foreign Application Priority Data
Feb. 27, 2018    (GB) ..................... 1803160

(51) Int. Cl.
*F16C 19/28*    (2006.01)
*F16C 33/36*    (2006.01)
(Continued)

(52) U.S. Cl.
CPC .............. *F16C 33/60* (2013.01); *F16C 19/28* (2013.01); *F16C 23/086* (2013.01); *F16C 33/36* (2013.01);
(Continued)

(58) Field of Classification Search
CPC ........ F16C 19/28; F16C 19/38; F16C 23/985; F16C 33/36; F16C 33/48; F16C 33/504; F16C 33/60; F16C 35/042
(Continued)

(56) References Cited

U.S. PATENT DOCUMENTS 3,166,363 A * 1/1965 Pitfield ................. F16C 23/084
384/570
3,262,185 A * 7/1966 Hornigold .............. F16C 33/60
29/898.066
(Continued)

FOREIGN PATENT DOCUMENTS

CN      204477058 U  *  7/2015  .............. F16C 19/28
CN      204477058 U      7/2015
(Continued)

OTHER PUBLICATIONS

EPO/ISR. PCT/GB2019/050456, PCT Search Report and Written Opinion dated Jul. 9, 2019, Cooper Roller Bearings Company Limited (12 pgs).
(Continued)

*Primary Examiner* — Marcus Charles
(74) *Attorney, Agent, or Firm* — Crawford Maunu PLLC (57) ABSTRACT

A split double row spherical roller bearing comprising an outer ring including an outer race, an inner ring within the outer ring including an inner race, a cage mounted between the inner and outer races, the cage mounting rollers which engage the inner and outer races, the inner ring, inner race, outer ring, outer race, and cage each comprising two generally semicircular parts engageable together to form a circular component via respective radially extending contact surfaces, and characterized in that the contact surfaces of at
(Continued)

least the outer ring comprise a saw-tooth arrangement in which the angle of each saw tooth joint is between 25 and 40 degrees.

20 Claims, 12 Drawing Sheets

(51) Int. Cl.
  *F16C 33/48* (2006.01)
  *F16C 33/60* (2006.01)
  *F16C 23/08* (2006.01)
(52) U.S. Cl.
  CPC .......... *F16C 33/48* (2013.01); *F16C 2220/68* (2013.01); *F16C 2226/60* (2013.01)
(58) Field of Classification Search
  USPC ............... 384/504, 560, 564, 570, 585–586
  See application file for complete search history.

(56) References Cited

U.S. PATENT DOCUMENTS

| | | | | |
|---|---|---|---|---|
| RE26,591 E | * | 5/1969 | Kay | ...................... F16D 1/0864 |
| | | | | 384/585 |
| 3,446,542 A | * | 5/1969 | Whitehurst | ........... F16C 23/084 |
| | | | | 384/477 |
| 3,910,656 A | * | 10/1975 | Price | ..................... F16C 23/086 |
| | | | | 384/558 |
| 5,630,669 A | * | 5/1997 | Stewart | ................... F16C 19/26 |
| | | | | 384/570 |
| 8,819,939 B2 | * | 9/2014 | Pohlman | ................. F16C 33/60 |
| | | | | 29/898.066 |
| 9,140,296 B2 | * | 9/2015 | Caspall | ................. F16C 23/086 |
| 9,512,881 B2 | * | 12/2016 | Katayama | ........... F16C 33/4652 |
| 2005/0084192 A1 | * | 4/2005 | Takeo | ....................... F16C 9/02 |
| | | | | 384/457 |
| 2012/0211470 A1 | * | 8/2012 | Webster | .................. F16C 33/48 |
| | | | | 219/69.17 |
| 2017/0097046 A1 | * | 4/2017 | Hadden | ................. F16C 35/047 |

FOREIGN PATENT DOCUMENTS

| | | | | |
|---|---|---|---|---|
| CN | 105073345 B | * | 6/2017 | ............. B25B 27/06 |
| DE | 102007054468 A1 | | 5/2008 | |
| DE | 112008002385 T5 | * | 7/2010 | ........... F16C 23/086 |
| EP | 2278182 A1 | | 1/2011 | |
| FR | 1378771 A | * | 11/1964 | .............. F16C 21/00 |
| FR | 1517274 A | * | 3/1968 | .............. F16C 33/64 |
| FR | 2393976 A1 | | 1/1979 | |
| GB | 543180 A | * | 2/1942 | ............. F16C 33/60 |
| GB | 2308868 A | | 7/1997 | |
| JP | 2007255579 A | * | 10/2007 | ............. F16C 33/60 |
| WO | 2013/050751 A1 | | 4/2013 | |

OTHER PUBLICATIONS

EPO/IPRP. PCT/GB2019/050456, PCT International Preliminary Report on Patentability dated Apr. 28, 2020, Cooper Roller Bearings Company Limited (14 pgs).

\* cited by examiner

DOUBLE ROW SPHERICAL ROLLER BEARING

The present invention relates to split roller bearings, in particular split double row spherical roller bearings.

As is known, a split roller bearing of conventional design employs inner and outer rings between which a series of rollers are held in a spaced apart relationship by a cage. The rollers are locatable on rolling surfaces of the rings or in roller tracks formed in the rings. The bearing is made to separate into two approximately equally sized halves and each half of the bearing is then composed of semi-circular inner and outer ring components and a semi-circular cage component. Split double row spherical roller bearings are double row roller bearings split in a similar fashion. Split roller bearings are used in many applications including propulsion shafts of ships, conveyor drums, industrial fans, mixers etc., but currently the double row spherical configuration of split bearing is generally commercially limited to a small number of slow speed applications including continuous casting machines, conveyors and steel converters.

When re-assembling a split bearing, it is important that accurate alignment of the respective halves of the inner and outer rings is achieved. The inner ring is generally clamped or otherwise secured to the shaft around which the bearing is positioned, and alignment of the two halves of the inner ring is accommodated as part of this process. The outer ring is not secured in this manner, and there are particular problems associated with conventional approaches relied upon to align the two outer halves in respect of split double row spherical roller bearings.

One conventional approach adopted to align the two outer ring halves includes dividing the outer ring into two approximately equal parts via a 'V'-shaped split where the two halves rest against each other and there is no mechanical connection securing the two halves together. This arrangement is satisfactory when the bearing is 'fixed', i.e. when the bearing is positioned within a housing adapted to receive the bearing, the housing being sized to receive the bearing with little 'play' for the bearing to move within the housing. Such a fixed bearing provides for axial location of the shaft. However, there is often more than one bearing on a shaft and it is desirable for only one of the bearings to be fixed, and for the remaining bearings to be free to move axially to accommodate for example thermal expansion of the shaft during use.

For free bearings which are not held in a fixed position in a housing, and which allow for axial movement of the bearing, the lack of a mechanical connection between the two halves can result in the two halves wedging apart in the housing due to action of the rollers and jamming.

Another conventional approach adopted to align the two outer ring halves includes dividing the outer ring into two approximately equal parts via a machined or fractured approximately straight-line split. The two halves are then joined together, and either dowels or shoulders on the joint screws are relied upon for relative location of the two halves. A problem with this approach is that openings must be formed in the respective outer ring halves to receive the dowels or joint screws, which is difficult and costly.

For example, the openings to accommodate for example screws and their associated threads, which must be positioned accurately and be a suitable size and so on, must be machined into the halves. If the fit is not sufficiently accurate, step-like discontinuities may form between the two halves in use, compromising bearing performance.

The machining of the jointing features may be carried out before hardening, i.e. while the material is in a relatively soft state, however this can cause problems during heat treatment. Alternatively, the machining may be carried out after hardening, to avoid the dimensional and other difficulties resulting from heat treatment, but this is much more costly.

In addition, whichever manufacturing method is chosen the sharp corners of features formed in the hard material to join the two halves together can result in susceptibility to fracture of parts rendered brittle due to the hardening process.

The present invention is directed to address the difficulties associated with accurate alignment of the two ring halves and maintaining this alignment in use.

The present invention is directed to a split double row spherical roller bearing comprising an outer ring including an outer race; an inner ring within the outer ring including an inner race; a cage mounted between the inner and outer races, the cage mounting rollers which engage the inner and outer races, the inner ring, inner race, outer ring, outer race, and cage each comprising two generally semi-circular parts engageable together to form a circular component via respective radially extending contact surfaces, and characterized in that the contact surfaces of at least the outer ring comprise a saw-tooth arrangement in which the angle of each saw tooth joint is between 25 and 40 degrees.

Preferably the saw tooth surface includes a plurality of direction changes.

Preferably the plurality of direction changes comprises 5 direction changes.

Preferably the plurality of direction changes comprises 7 direction changes.

Preferably the saw tooth tips are rounded.

Preferably the saw tooth tips are truncated to form a flattened portion.

Preferably the outer ring contact surfaces also include portions on respective sides of the saw tooth portion which are parallel to a radial plane of the ring.

Preferably the parallel portions are wider than respective sides of the 'V' of the saw tooth portions.

Preferably a gap between corresponding contact surfaces of two half rings, when joining to form a ring, is greater at said parallel portions than at said saw tooth portions.

Preferably the inner ring contact surface includes a saw tooth portion.

Preferably the cage contact surface includes a saw tooth portion.

Preferably the split double row spherical roller bearing further comprises a shroud positioned between the housing and the outer ring.

Preferably the shroud comprises two semi-circular parts engageable together to form a circular component via respective radially extending contact surfaces.

Preferably the shroud is made from a ductile material.

Preferably the ductile material is ductile steel.

Preferably the shroud and outer race are axially slidable in the housing.

Preferably the shroud is adapted to accommodate mechanical fixings to secure the shroud halves together.

In addition, the present invention is directed to a method for manufacturing a split roller bearing outer race wherein a continuous ring is cut using apparatus which forms a cut of generally consistent width in the material such as wire electro-discharge machining to form two generally semi-circular parts in accordance with the apparatus discussed above.

The present invention is further directed to a method for manufacturing a split double row spherical roller bearing wherein a continuous ring is cut using apparatus which forms a cut of generally consistent width in the material such as wire electro-discharge machining to form two generally semi-circular parts in accordance with the apparatus discussed above.

Preferably the method includes cutting a parallel portion and a saw tooth portion, wherein cutting the parallel portion removes more material than cutting the saw tooth portion.

Preferred embodiments of the invention will now be described by way of examples only, with reference to the accompanying drawings wherein:

FIG. 6 (a)-(d) show the circumferential length of a half ring in accordance with a second embodiment of the present invention;

FIGS. 7 (a) and (b) show a round split ring, and a split ring which is not round, respectively;

FIG. 7 (c) shows a junction between respective outer ring halves, as may be implemented with FIGS. 7 (a) and 7(b);

FIGS. 8 (a)-(d) show further potential misalignments where the half rings join;

Figure 1:
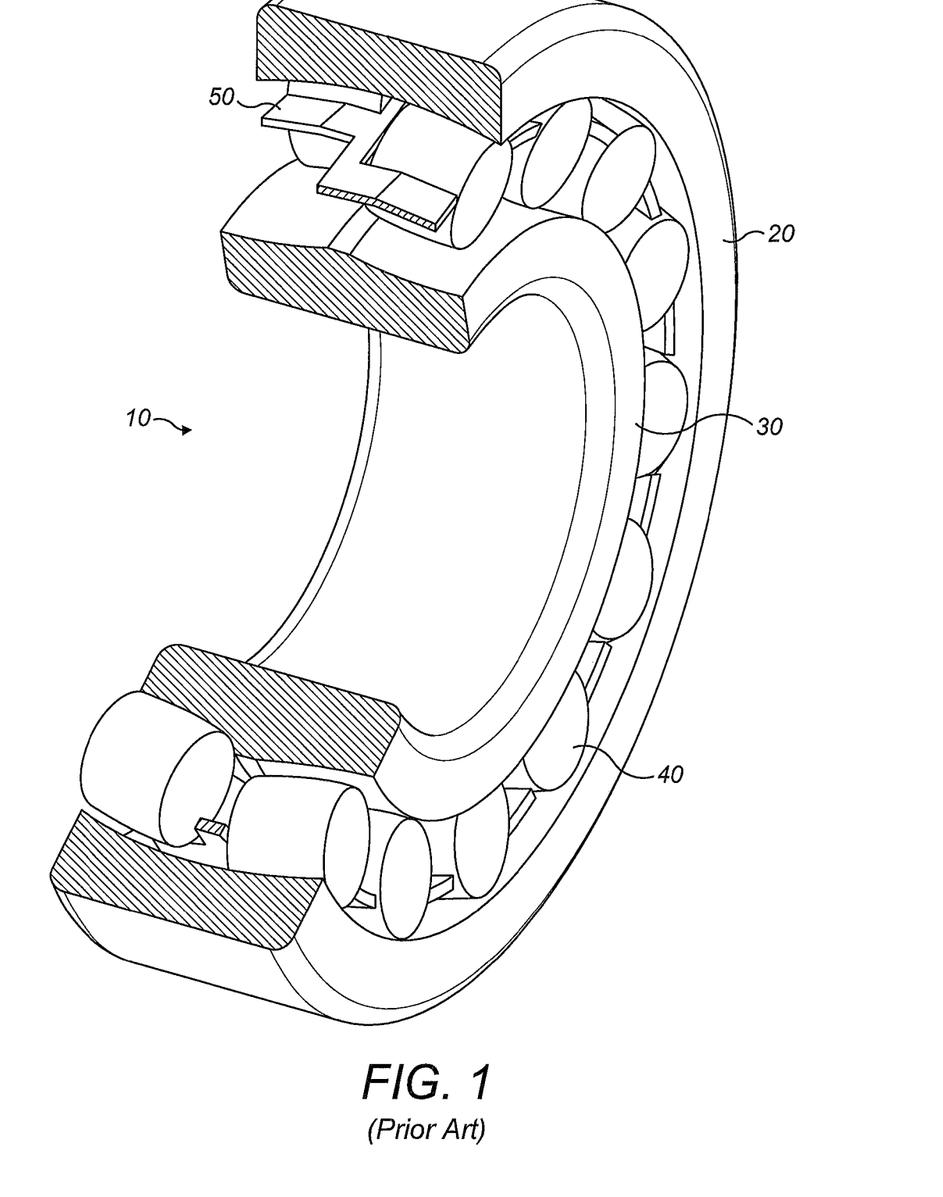
FIG. 1 shows a double row of rollers in a portion of a prior art double roller bearing.

FIG. 1 shows an exemplary prior art double row spherical roller bearing 10, comprising an outer ring 20, an inner ring 30, and a double row of roller bearings 40 in a cage 50, positioned between the inner and outer rings.

Figure 2:
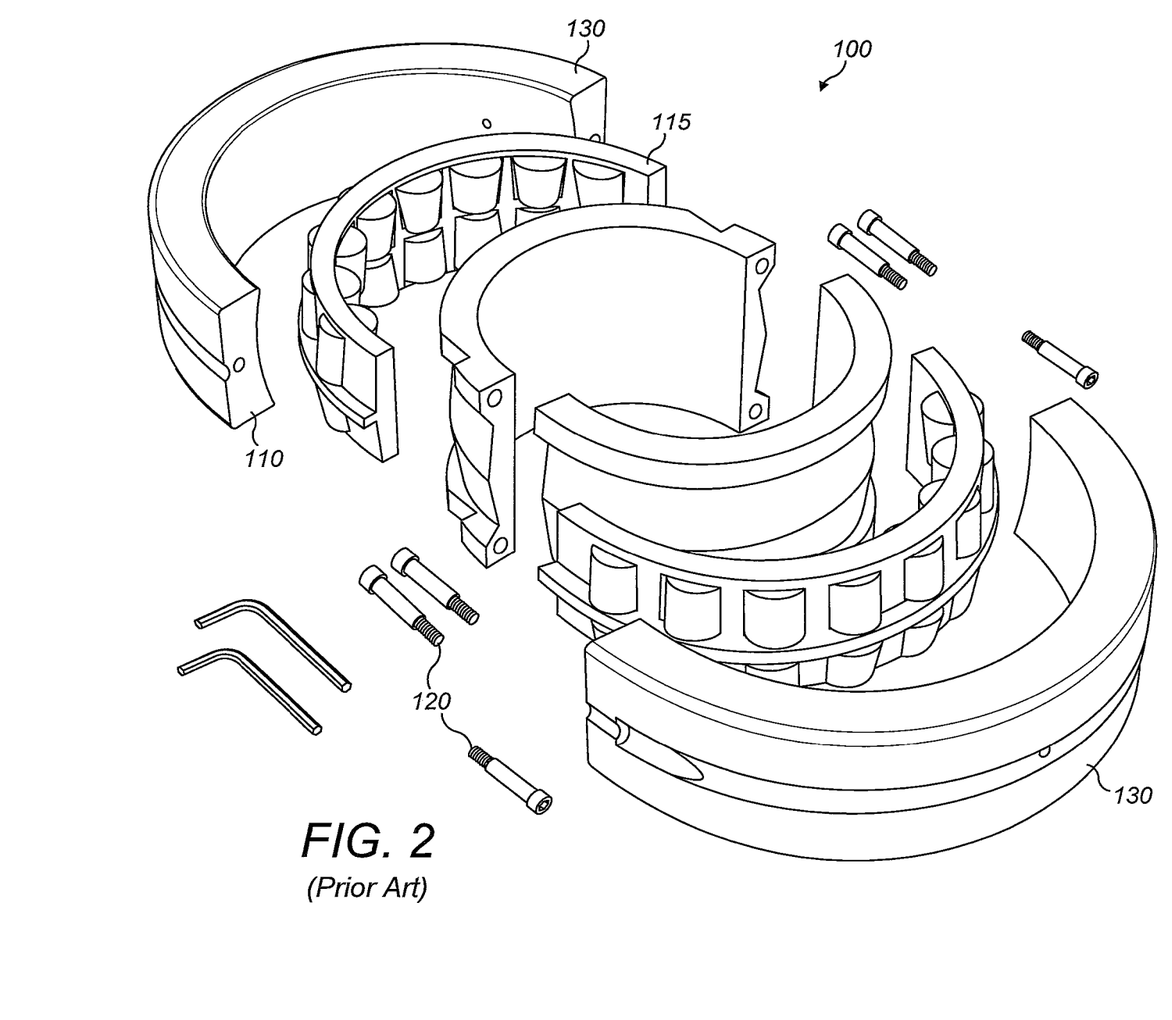
FIG. 2 shows an exploded view of component parts of a prior art split double row spherical roller bearing.

FIG. 2 shows a prior art split double row spherical roller bearing 100 in an exploded view with an approximately straight-line split 110 separating the respective outer ring halves 130, and also shows cage 115 in which rollers are mounted, and screws with locating shoulders 120 for joining the two halves of the outer ring 130 together.

Figure 3:
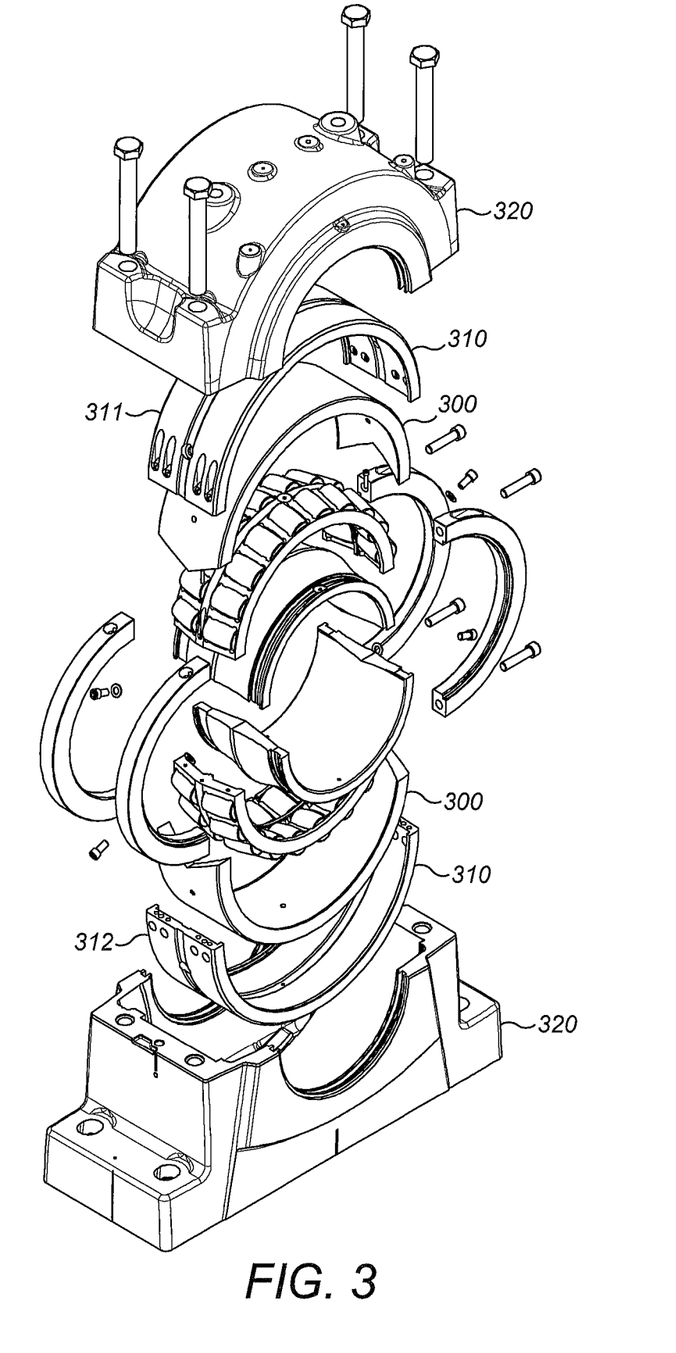
FIG. 3 shows a split double row spherical roller bearing with a shroud, in accordance with a first embodiment of the present invention.

FIG. 3 shows a split double row spherical roller bearing in accordance with a first embodiment of the present invention in which the outer ring 300 has been split by a conventional 'V' shaped split, and in which an additional part, or shroud 310, has been interposed between the outer ring 300 and a housing 320. Shroud 310 is also split into two approximately equal parts, 311 and 312, which may be mechanically secured together using for example screws and dowels. The outer ring halves, resting together, are contemplated to be a snug fit within the mechanically connected halves of the shroud, and are held securely in place thereby, providing for alignment of the two outer ring halves. In respect of free bearings, i.e. those not held in a fixed position in the housing, and which allow for axial movement of the bearing, the shroud, while a snug fit around the outer ring halves, is contemplated to fit more loosely within the housing, providing for the shroud and bearing to slide axially in the housing as required.

It is contemplated that a shroud in conformance with the first embodiment may be made from a ductile material such as for example ductile steel.

There are potential problems with this approach, however: in particular, the angle of the split line of a 'V' joint is conventionally approximately 18° and while this provides for a measure of self-alignment between the two halves, there remains a possibility that axial steps will form between the two halves as axial alignment forces upon the joint faces do not necessarily overcome the friction forces between the joint faces.

Figure 4:
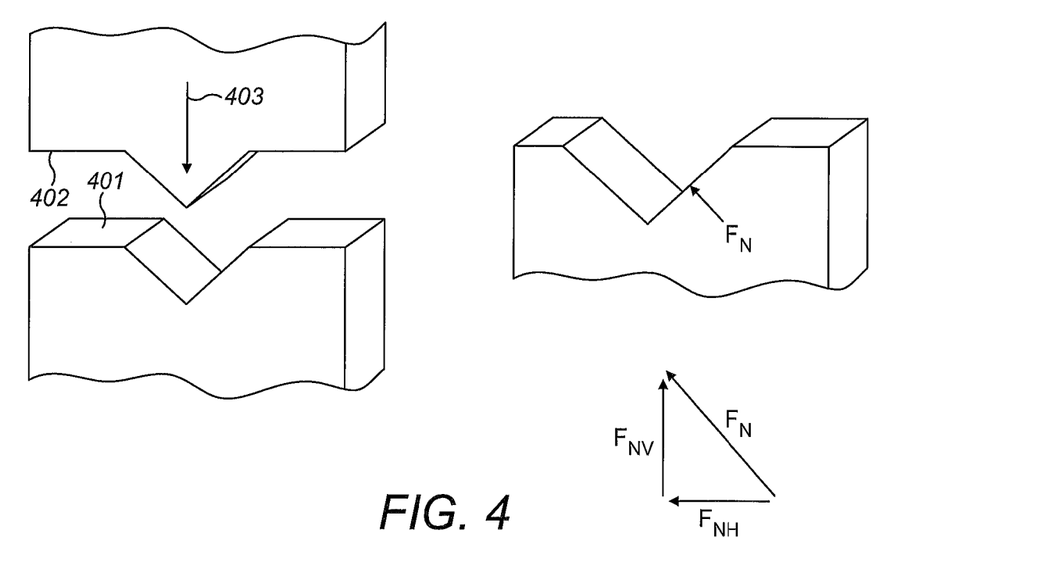
FIGS. 4, 4A, 4B and 5 show the forces operative where the split halves join, and potential misalignment.

For example, as can be seen from FIG. 4, when the two surfaces 401, 402 of the split ring come into contact there is a force 403 acting downwardly against the surface of the lower half and, in accordance with Newtons second law, a responsive 'Normal force' acting in the opposite direction. This Normal force has two components, a vertical component $F_{NV}$ and a horizontal component $F_{NH}$. $F_{NH}$ is the force that acts to urge the upper ring into alignment with the lower ring, to provide a smooth connection at the join, and is of particular interest.

Figure 5:
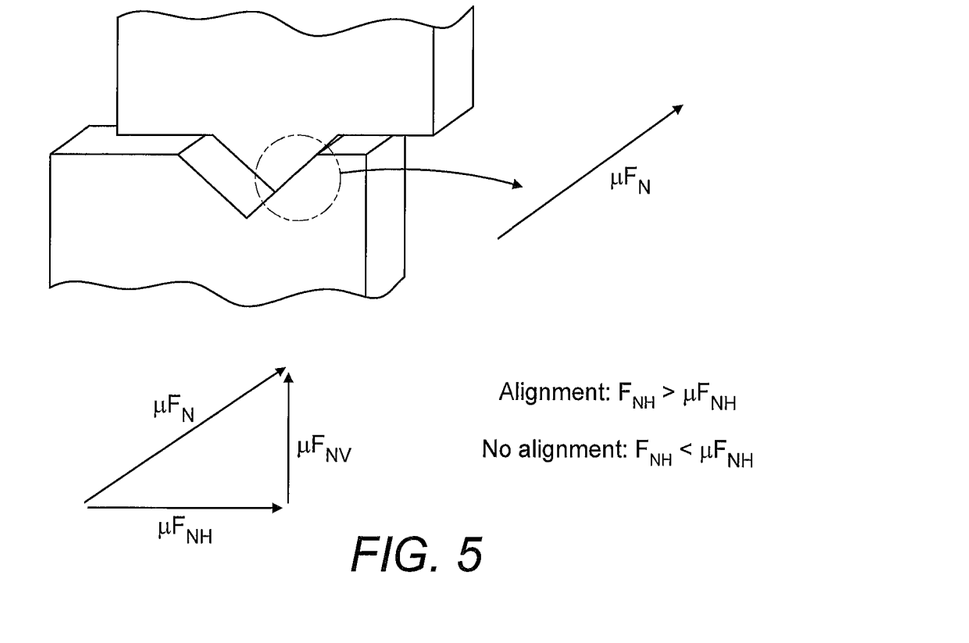

As is shown in FIG. 5, when the two surfaces 401, 402 are in contact and urged towards each other, the surfaces seek to 'slide past' each other, resulting in friction between the two surfaces. This frictional force is the product of the coefficient of friction µ and the force between the two surfaces. This frictional force also has two components, a horizontal component $\mu F_{NH}$ and a vertical component $\mu F_{NV}$. The horizontal component acts to resist any movement of the two surfaces relative to each other.

If the horizontal component of the frictional force is greater than the horizontal component of the Normal force then no movement will occur, and the upper ring will not align with the lower ring, i.e. for:

$$\mu F_{NH} > F_{NH} \qquad (i)$$

The two ring halves will not move into alignment, there will not be a smooth join, and axial steps will form between the two halves, whereas for:

$$\mu F_{NH} < F_{NH} \qquad (ii)$$

The two ring halves will move into alignment, and there will be a smooth join between the two halves.

A second embodiment is disclosed herein which provides a potential solution to this problem, which is to rely on a 'V' angle of between 25° and 40°, more particularly between 25° and 35°, more particularly still around 30°, as set out in FIG. 6 (a). This range of angles has been found to provide for an arrangement which satisfies equation (ii) above, resulting in a much more positive alignment between the two halves.

There are disadvantages in relying on such a larger 'V' angle however, as can be seen in FIG. 6 (a)-(d). Starting at any point of the 'V' shaped end of an outer ring half and moving along the circumferential surface of the outer ring half to the matching point on the other side of the half ring, will cover approximately 180°, i.e. it will measure out an approximate semi-circle. However, the distance from a point on the 'V' shaped end of an outer ring half to a non-matching point on the other 'V' shaped end of the half ring will not be equal to 180°, i.e. the half ring will not be a semi-circle but will be greater than a semi-circle. This is shown by reference numerals 600, 610, 620, 630, 640 and 650 in FIGS. 6 (a) and (b). For example, FIG. 6 (b) shows that the distance between point 620 at a first end 601 of the half ring to a point 650 on a second end 602 of the half ring is greater than half the circumference of the ring.

This difference in length depends on the deviation of relative points of the half ring from a semicircle, i.e. the depth of the 'V' compared to a straight line cut at the split ring edge, shown by X and X' in FIGS. 6 (*b*) and (*d*), respectively. As can be seen from FIGS. 6 (*b*) and (*d*), the smaller V angle has a depth X that is smaller than the depth X' of the V with the larger angle.

This can cause a problem when for example assembling the bearing including the two half rings. This can also make assembly challenging since there is only a small amount of clearance in the bearing.

This is more of an issue with split double row spherical roller bearings compared with other split bearings due to their relatively wider outer ring, as can be seen in for example FIGS. 6 (*b*), as the depth of the 'V' shape extends further on each side of the of the ring (as the ring is wider) so that the increase in circumferential distance, and the increase in the angle beyond 180°, i.e. the extent to which the distance covered by the half ring exceeds a semi-circle, becomes significant, for example extending to in the region of 192° as shown in FIG. 6 (*a*), in particular when the available clearances are considered. Where the depth of the 'V' is shallower, the increase in angle beyond 180° is less significant, and may be of the order of 187° as shown in FIG. 6 (*c*).

A further difficulty is that the increase in angle beyond 180° can lead to radial steps at the joints if the outer ring, once reformed from the split halves, is not perfectly round.

Figure 7A:
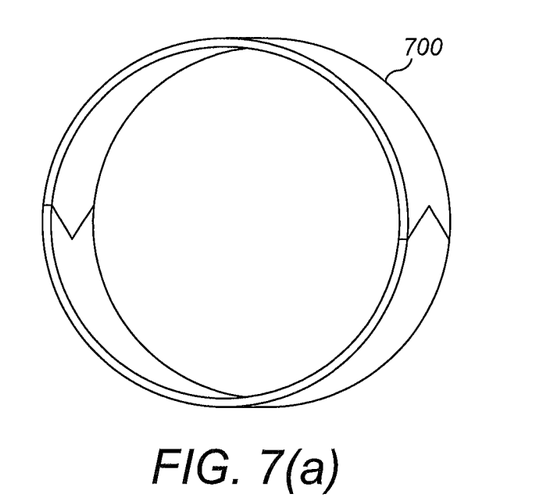

FIG. 7 (*a*) shows two outer ring halves which are semicircular and so combine together to form a round outer ring with minimal distortion at the join, 700.

Figure 7B:
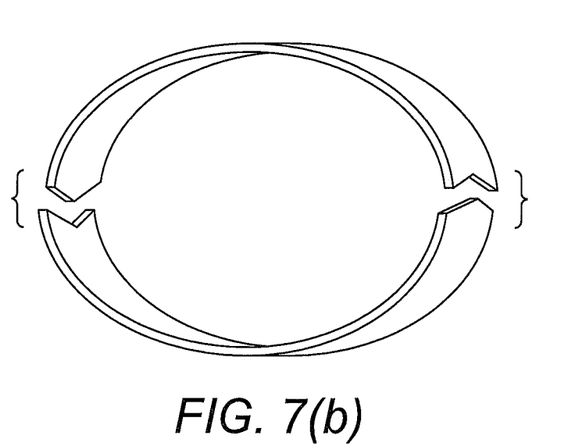
Figure 7C:
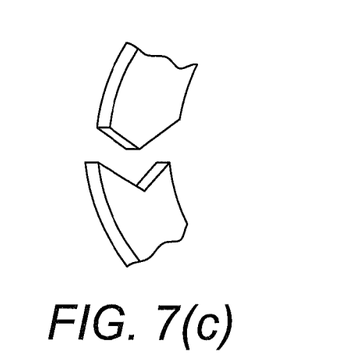
Figure 8A:
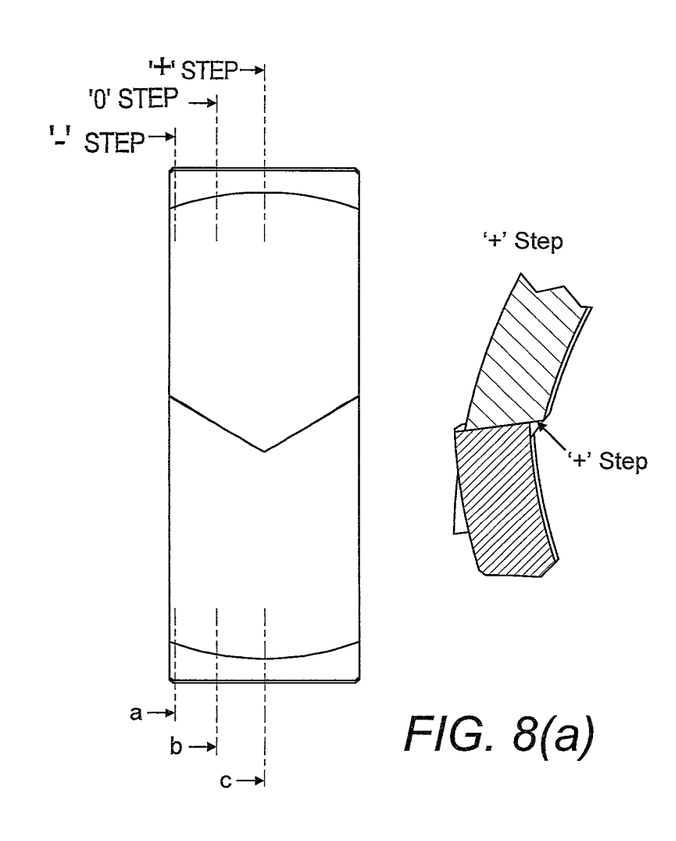
Figure 8B:
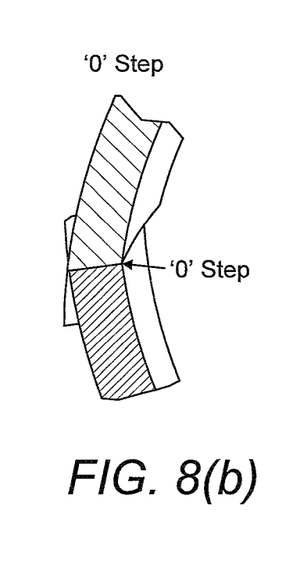
Figure 8C:
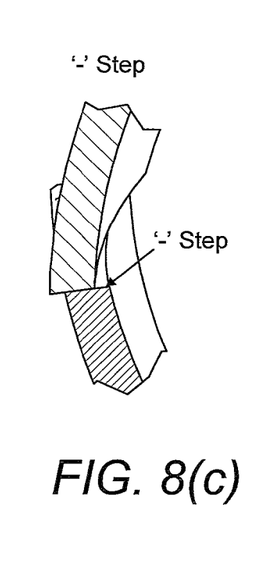
Figure 8D:
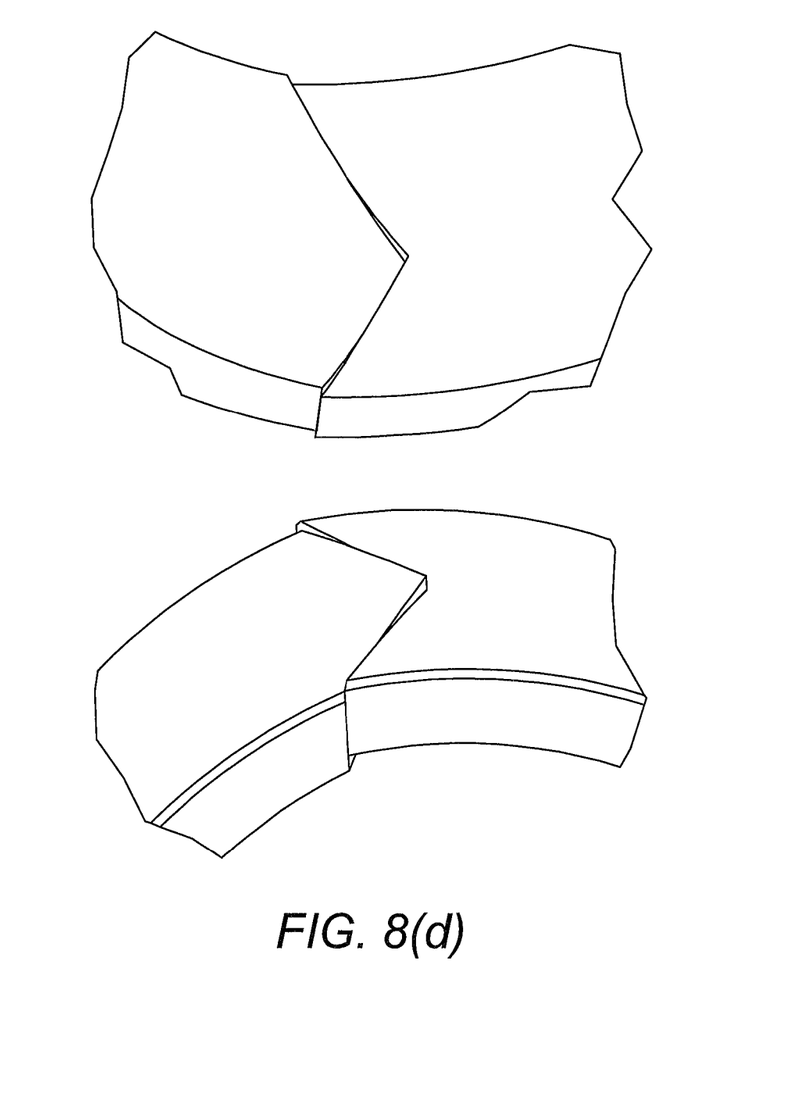

FIG. 7 (*b*) shows an exaggerated example of two outer ring halves which are not semi-circular and so do not combine together to form a perfectly round outer ring: as a consequence, the two ends do not join together smoothly but each end extends slightly beyond the respective end of the other half ring, as can be seen in FIG. 7 (*c*).

This problem is not uncommon for split ring bearings such as split cylindrical and split tapered bearings, and a conventional solution is to make the outer ring approximately a 'size to size fit' in the housing. The housing is substantially stiffer than the outer ring, with the result that the ring is forced into an acceptable round shape by the housing. However, as discussed above, for split double row spherical roller bearings the outer ring is often required to be a loose fit in the housing to allow it to slide axially and so in this case the housing cannot be relied upon to ensure the ring adopts a round shape.

As stated, in accordance with the first embodiment of the present invention, and as can be seen in FIG. 3, a shroud 310 is interposed between the housing 320 and the outer ring 300, the shroud being a 'size to size fit' with the outer ring, meaning that the outer ring fits snuggly in the shroud. The shroud is required to be a loose fit in the housing, however, to provide for the axial movement discussed. As has been stated, the housing cannot be relied upon to ensure the outer ring adopts an acceptable round shape, and the shroud itself cannot be relied upon to ensure an acceptable round shape for the outer ring either as there is typically insufficient space to allow the shroud to be of sufficient radial thickness to provide it with the required stiffness. As a consequence, if the outer ring is not round there is no mechanism to ensure an acceptable round shape for the outer ring, and indeed the shroud may be distorted to reflect the actual shape of the outer ring.

While the outer ring may be machined to an acceptably round form, once released from the machining fixture, due to the release of stresses and so on, the two halves of the ring may relax into a shape that is larger across the joints than at 90° to the joints, i.e. the two halves may not settle into perfect semi-circular shapes. Abutting the two halves together may then result in a discontinuity at the join, as seen in FIG. 7 (*c*), potentially leading to 'stepping' where the two halves join. This can be seen in FIGS. 8 (*a*)-(*d*) which shows a neutral position where there is no radial step between the two halves, and which shows stepping on either side of this neutral position, with the male joint stepped radially inwards or outwards of the female joint, creating a discontinuity in the roller path. FIG. 8 (*d*) shows an overview of this eventuality.

As stated, it is preferable for the outer ring to be round, although in practice some roundness error can be tolerated and will not of itself lead to problems in relation to performance of the bearing. However, stepping between the two halves, where the halves join together, is an issue which can lead to significant performance problems.

Figure 9:
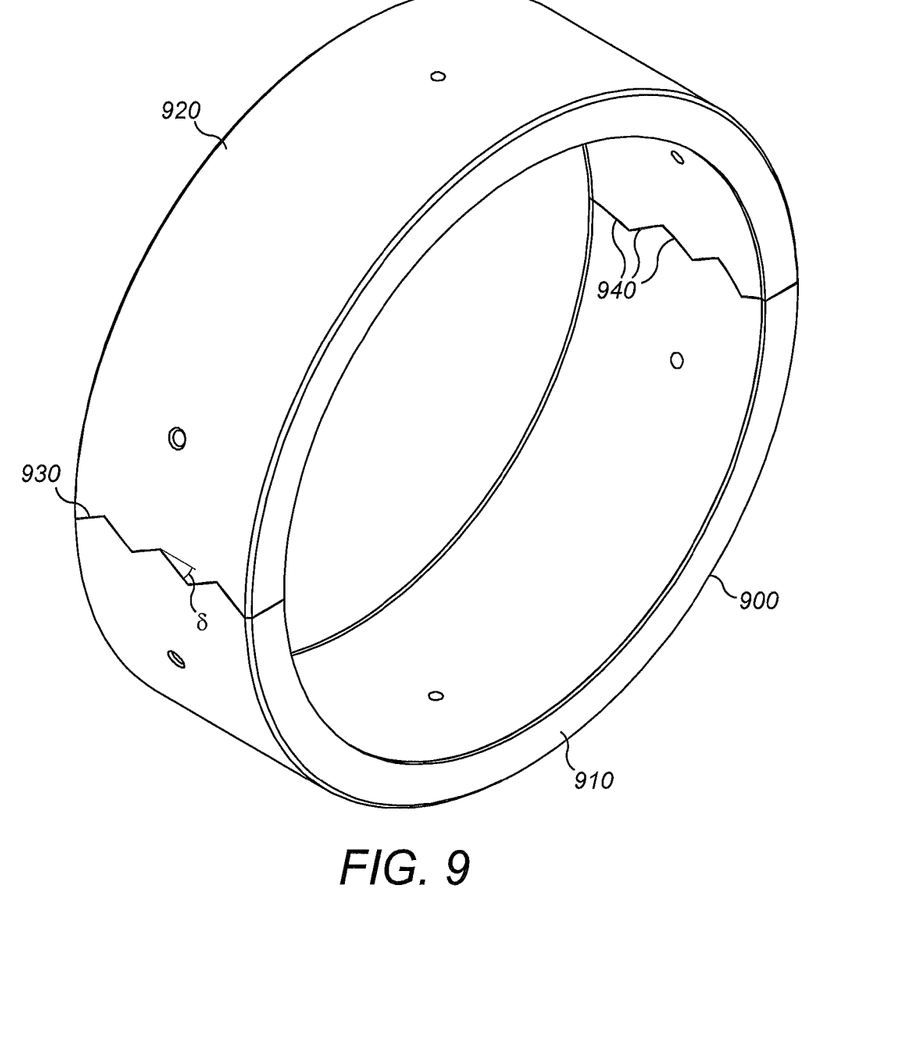
FIG. 9 shows a perspective view of a split ring in accordance with a third embodiment of the present invention.

FIG. 9 shows a third embodiment of a split ring in accordance with the present invention.

FIG. 9 shows a perspective view of a split ring 900 of the second embodiment, with the two halves 910, 920 positioned in a joined orientation, showing a jagged split 930 separating the two halves. The jagged split comprises a series of 'V' shaped lines 940 along which the bearing is split. Each joint angle, δ, as shown in FIG. 9 is between 25° and 40°, and may be approximately 30°, as in the second embodiment, but unlike the second embodiment multiple changes of direction along the split line are relied upon. The number of direction changes in the split line may vary and may include for example between 1 and 10 direction changes. More particularly the number of direction changes may be 7 direction changes, or 5 direction changes, or 3 direction changes.

The inclusion of multiple direction changes in the split line has the advantage that it reduces the size of the steps at the joints caused by a given error in the roundness of the halves of the outer ring.

Figure 6A:
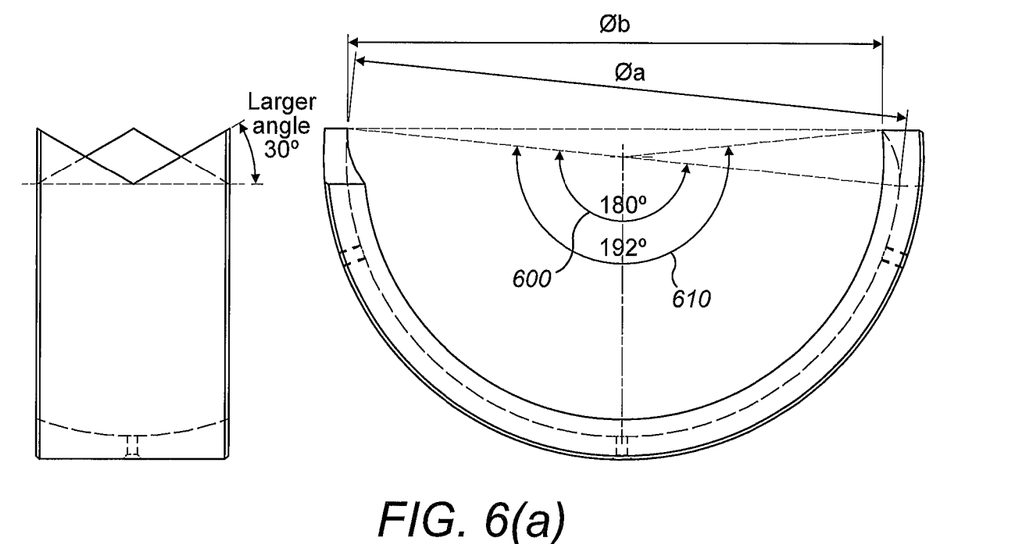
Figure 6B:
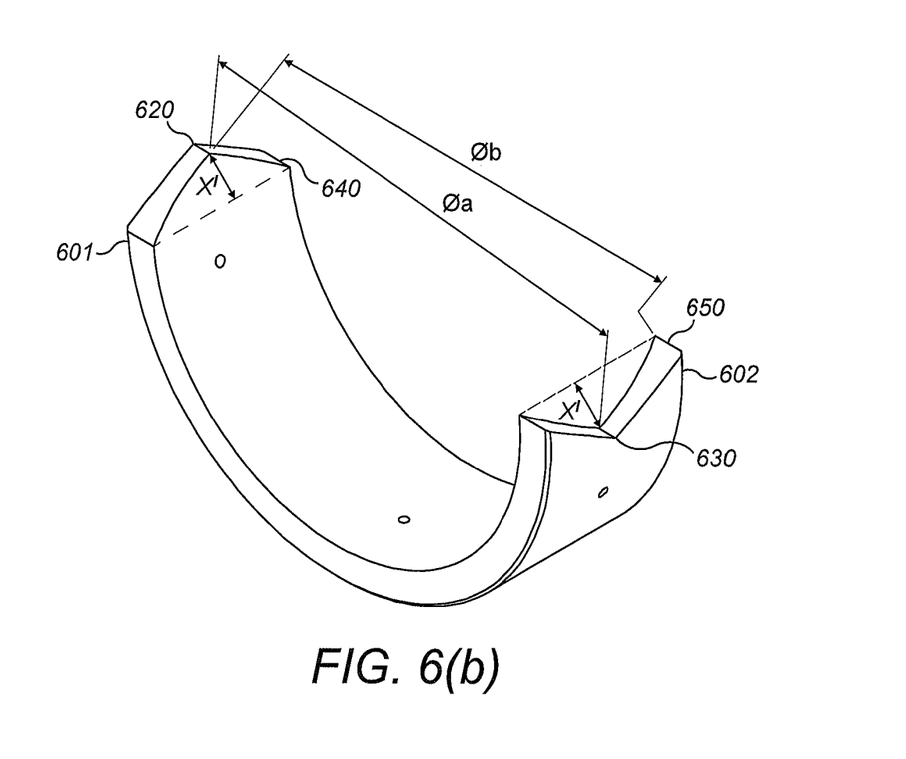
Figure 6C:
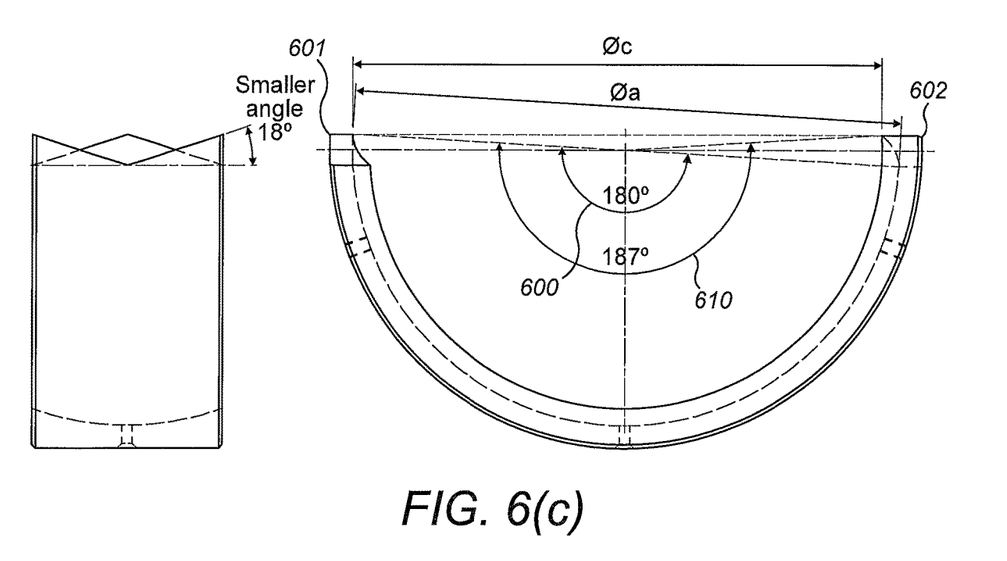
Figure 6D:
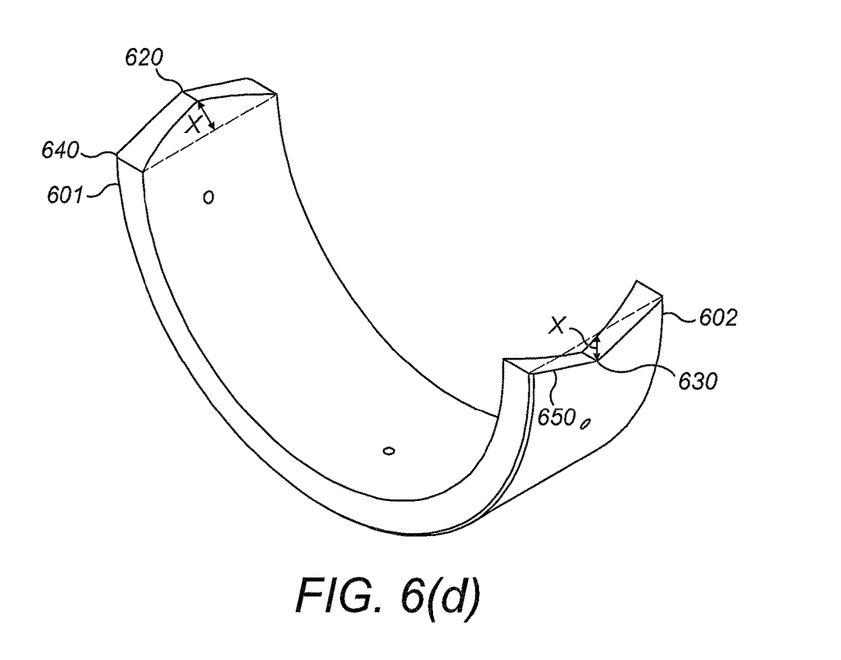

This is because there are several 'V' shapes, the depth of any of the 'V' shapes being less than the depth of the single 'V' shape of the second embodiment, meaning that the longest distance between a point on one end of a half ring to any point on the other end of the half ring will be closer to half the circumferential distance, and the angle will be closer to 180°, avoiding many of the problems discussed in relation to the second embodiment. A single 'V' shaped split may result in an angle of, for example, 187°, as shown in FIG. 6 (*c*), whereas several changes of direction in the split may result in an angle of, for example, 183° (not shown), which is much more manageable.

In addition, the two halves can be mounted around the rest of the bearing more easily. Further, the shallower peaks and troughs of the jagged edges of the joins will mean the two halves are easier to join together, and the resulting join smoother.

Figure 4A:
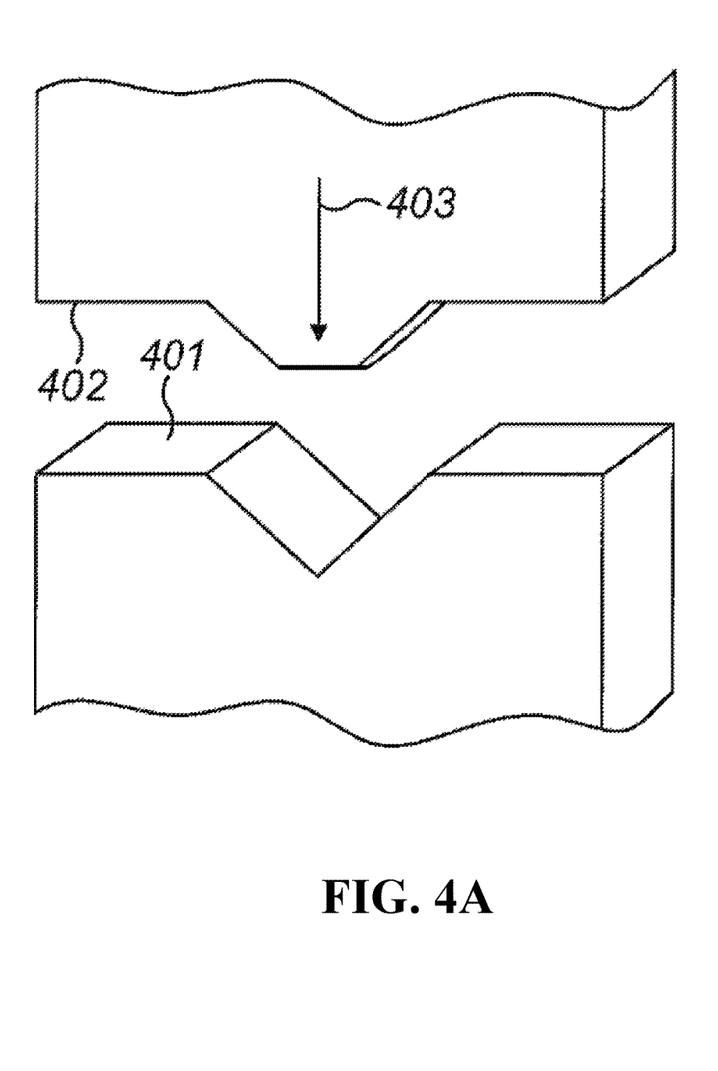
Figure 4B:
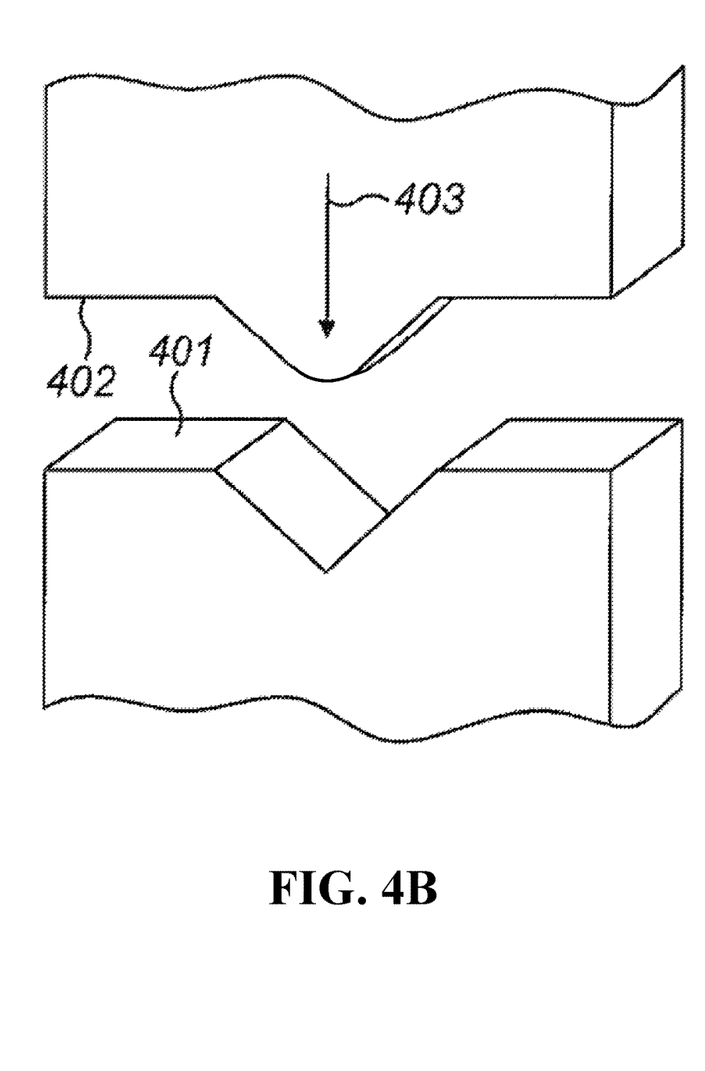

It is contemplated that the peaks and troughs of the half ring ends are rounded, meaning that the peaks or tips of the jagged edges are removed as depicted in FIG. 4B during the cutting process that creates the split, and the troughs or bottoms of the jagged edges are also smoothed. It is further contemplated that the peaks, or saw tooth tips, may for example be truncated to form a flattened portion as depicted in FIG. 4A. This has the advantage of avoiding any tendency of the tip of the peak, and the corresponding female part, to foul when the halves are abutted.

Figure 10:
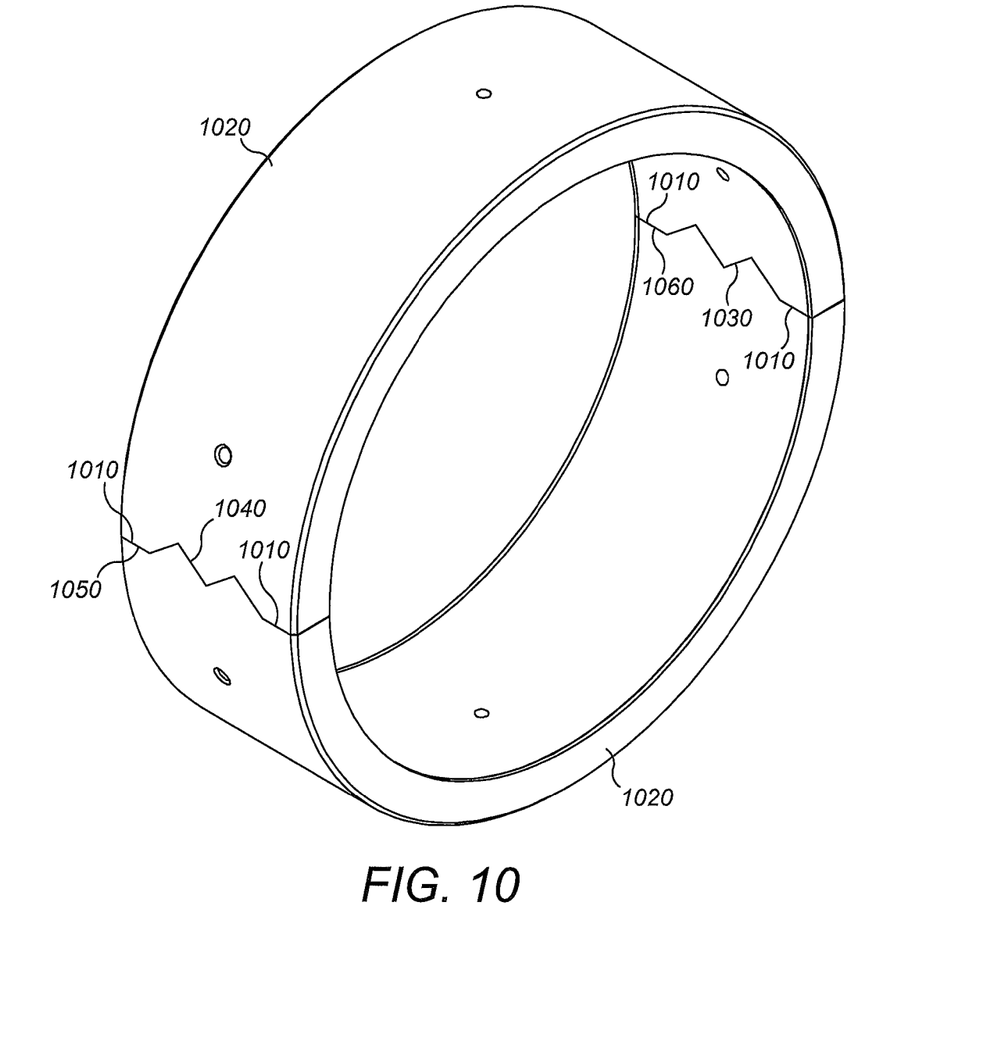
FIG. 10 shows a perspective view of a split ring in accordance with a fourth embodiment of the present invention.

In a further embodiment, it is contemplated that the surfaces of the two half rings that, when in contact, provide for the formation of a complete ring, include planar portions 1010 either side of the saw tooth portion 1030 as shown in FIG. 10. The planar portions extend from the saw tooth portions 1030 to respective edges 1020 of the ring and are parallel to a radial plane of the bearing.

It is contemplated that the parallel portions 1010 of the contact surfaces are wider than individual edges of each 'V' of the saw tooth.

When splitting the outer ring into two, some material is lost, creating a gap between the two halves, and it is contemplated that the gap, or material lost, is greater between respective parallel portions 1010 than between the angled portions 1040. This ensures that the when the two halves are joined together the parallel portions 1010 will not touch, ensuring that the angled portions 1040 will come into contact and be effective in aligning the two halves together.

It is contemplated that seals may be positioned at end faces of the outer ring, and it is further contemplated that the seals may utilise the parallel portions for engaging with the outer ring.

The invention is not limited to the embodiments disclosed herein but relates to any suitable alternative that falls within the overall scope of the invention. In particular it is contemplated that any and all the embodiments may be relied upon singly or in combination.

The invention claimed is:

1. A split double row spherical roller bearing, comprising:
   an outer ring including an outer race;
   an inner ring within the outer ring including an inner race; and
   a cage mounted between the inner and outer races, said cage mounting rollers which engage the inner and outer races,
   said inner ring, inner race, outer ring, outer race, and cage each comprising two generally semicircular parts engageable together to form a circular component via respective radially extending contact surfaces,
   characterized in that the contact surfaces of at least the outer ring comprise a saw-tooth arrangement having a surface and saw tooth tips in which the angle of each saw tooth joint is between 25 and 40 degrees from a horizontal cross-section from which the saw tooth tips extend,
   wherein said saw tooth surface includes a plurality of direction changes, and
   wherein said plurality of direction changes comprises at least 5 direction changes.

2. A split double row spherical roller bearing as claimed in claim 1, wherein said plurality of direction changes comprises at least 7 direction changes.

3. A split double row spherical roller bearing as claimed in claim 1 wherein said saw tooth tips are rounded.

4. A split double row spherical roller bearing as claimed in claim 1 wherein said saw tooth tips are truncated to form a flattened portion.

5. A split double row spherical roller bearing as claimed in claim 1, wherein said outer ring contact surfaces also include portions on respective sides of portions of the saw tooth arrangement which are parallel to a plane which is along a radius of the outer ring and perpendicular to a radial plane of the ring.

6. A split double row spherical roller bearing as claimed in claim 5, wherein said parallel portions are wider than respective sides of a 'V' shape of the saw tooth portions.

7. A split double row spherical roller bearing as claimed in claim 5, wherein a gap between corresponding contact surfaces of two half rings, when joining to form a ring, is greater at said parallel portions than at portions of said saw tooth arrangement.

8. A split double row spherical roller bearing as claimed in claim 1 wherein the inner ring contact surface includes a saw tooth portion.

9. A split double row spherical roller bearing, as claimed in claim 1 wherein the cage contact surface includes a saw tooth portion.

10. A split double row spherical roller bearing, comprising:
    an outer ring including an outer race;
    an inner ring within the outer ring including an inner race;
    a shroud positioned between a housing and the outer ring; and
    a cage mounted between the inner and outer races, said cage mounting rollers which engage the inner and outer races,
    said inner ring, inner race, outer ring, outer race, and cage each comprising two generally semicircular parts engageable together to form a circular component via respective radially extending contact surfaces,
    characterized in that the contact surfaces of at least the outer ring comprise a saw-tooth arrangement having a surface and saw tooth tips in which the angle of each saw tooth joint is between 25 and 40 degrees,
    wherein said saw tooth surface includes a plurality of direction changes, and
    wherein said plurality of direction changes comprises at least 5 direction changes.

11. A split double row spherical roller bearing as claimed in claim 10, wherein said shroud comprises two semicircular parts engageable together to form a circular component via respective radially extending contact surfaces.

12. A split double row spherical roller bearing as claimed in claim 10, wherein said shroud is made from a ductile material.

13. A split double row spherical roller bearing as claimed in claim 12, wherein said ductile material is steel.

14. A split double row spherical roller bearing as claimed in claim 10, wherein said shroud and outer race are axially slidable in said housing.

15. A split double row spherical roller bearing as claimed in claim 10, wherein said shroud is adapted to accommodate mechanical fixings to secure the shroud halves together.

16. A split double row spherical roller bearing as claimed in claim 10, wherein said saw tooth tips are rounded.

17. A split double row spherical roller bearing as claimed in claim 10, wherein said saw tooth tips are truncated to form a flattened portion.

18. A split double row spherical roller bearing as claimed in claim 10, wherein said outer ring contact surfaces also include portions on respective sides of portions of the saw tooth arrangement which are parallel to a plane which is along a radius of the outer ring and perpendicular to a radial plane of the ring.

19. A split double row spherical roller bearing as claimed in claim 18, wherein said parallel portions are wider than respective sides of a 'V' shape of the saw tooth portions.

20. A split double row spherical roller bearing as claimed in claim 18, wherein a gap between corresponding contact surfaces of two half rings, when joining to form a ring, is greater at said parallel portions than at portions of said saw tooth arrangement.

* * * * *